United States Patent
Schielein et al.

(10) Patent No.: US 11,016,041 B2
(45) Date of Patent: May 25, 2021

(54) APPARATUS AND METHOD FOR CALCULATING A RECORDING TRAJECTORY

(71) Applicants: Fraunhofer-Gesellschaft zur Foerderung der angewandten Forschung e.V., Munich (DE); Julius-Maximilians-Universitaet Wuerzburg, Wuerzburg (DE)

(72) Inventors: Richard Schielein, Rednitzhembach (DE); Wolfgang Holub, Fuerth (DE)

(73) Assignees: Fraunhofer-Gesellschaft zur Foerderung der angewandten Forschung e.V., Munich (DE); Julius-Maximilians-Universitaet Wuerzburg, Wuerzburg (DE)

( * ) Notice: Subject to any disclaimer, the term of this patent is extended or adjusted under 35 U.S.C. 154(b) by 252 days.

(21) Appl. No.: 16/252,130

(22) Filed: Jan. 18, 2019

(65) Prior Publication Data
US 2019/0170667 A1 Jun. 6, 2019

Related U.S. Application Data

(63) Continuation of application No. PCT/EP2017/068098, filed on Jul. 18, 2017.

(30) Foreign Application Priority Data

Jul. 21, 2016 (DE) .................. 10 2016 213 403

(51) Int. Cl.
*G01N 23/046* (2018.01)
*G01N 23/18* (2018.01)
*G01N 23/083* (2018.01)

(52) U.S. Cl.
CPC ........... *G01N 23/046* (2013.01); *G01N 23/18* (2013.01); *G01N 23/083* (2013.01);
(Continued)

(58) Field of Classification Search
CPC .... G01N 23/046; G01N 23/18; G01N 23/083; G01N 2223/606; G01N 2223/427;
(Continued)

(56) References Cited

U.S. PATENT DOCUMENTS

| 5,073,910 A | 12/1991 | Eberhard et al. |
| 2006/0198499 A1 | 9/2006 | Spies et al. |
| 2009/0046833 A1* | 2/2009 | Hirokawa ............... A61B 6/542 378/108 |
| 2012/0183121 A1 | 7/2012 | Perrin et al. |

FOREIGN PATENT DOCUMENTS

| DE | 4335301 C1 | 12/1994 |
| DE | 102014203971 A1 | 9/2015 |
| WO | 2014160766 A1 | 10/2014 |

OTHER PUBLICATIONS

Ferrucci, Massimiliano et al., "Towards Geometrical Calibration of X-Ray Computed Tomography Systems—A Review", In: Measurement Science Technology 26, 092003 (2015). 1-30, 2015, 1-30.
Fischer, Andreas et al., "CT Rekonstruktion mit Objektspezifischen Eerweiterten Trajektorien", DACH-Jahrestagung 2015, Salzburg, Austria, (May 10, 2015), URL: http://www.ndt.net/?id=18982, (Apr. 7, 2017), XP055362919, May 10, 2015.
(Continued)

*Primary Examiner* — Courtney D Thomas
(74) *Attorney, Agent, or Firm* — Perkins Coie LLP; Michael A. Glenn

(57) ABSTRACT

A calculating unit for calculating a recording trajectory of a CT system has a receive interface, an optimizer and a control unit. The receive interface serves for receiving measurement and simulation data relative to the object to be recorded. The optimizer is configured to determine the recording trajectory based on known degrees of freedom of the CT system, based on the measurement and simulation data and based on a test task from a group having a plurality of test tasks. The control unit is configured to output data in correspondence with the recording trajectory for controlling the CT system.

34 Claims, 5 Drawing Sheets

(52) U.S. Cl.
CPC ........... *G01N 2223/1016* (2013.01); *G01N 2223/306* (2013.01); *G01N 2223/33* (2013.01); *G01N 2223/405* (2013.01); *G01N 2223/41* (2013.01); *G01N 2223/419* (2013.01); *G01N 2223/427* (2013.01); *G01N 2223/606* (2013.01); *G01N 2223/648* (2013.01); *G01N 2223/66* (2013.01)

(58) Field of Classification Search
CPC ..... G01N 2223/1016; G01N 2223/306; G01N 2223/33; G01N 2223/405; G01N 2223/41; G01N 2223/419; G01N 2223/648; G01N 2223/66
See application file for complete search history.

(56) References Cited

OTHER PUBLICATIONS

Fischer, Andreas et al., "Object Specific Trajectory Optimization for Industrial X-ray Computed Tomography", Scientific Reports, (May 1, 2016), vol. 6, No. 1, doi:10.1038/srep19135, XP055404799, DOI: 10.1038/srep19135, May 1, 2016.

Markus, Rehak et al., "Acquisition Trajectories for X-Ray Tomosynthesis Applied to Planar Samples", (Jan. 1, 2010), URL: http://www.ndt.net/article/aero2010/papers/tu1a3.pdf, (Sep. 22, 2017), XP055409232.

Stayman, J W. et al., "Task-Based Trajectories in Iteratively Reconstructed Interventional Cone-Beam CT", (Feb. 4, 2013), URL: http://aiai.jhu.edu/papers/20130204_Fully3D_Abstract.pdf, (Sep. 22, 2017), XP055409208, Feb. 4, 2013.

\* cited by examiner

100

Receiving the measurement
and/or simulation data in step — 110

Data analyzed by the optimizer and processed,
in combination with the respective case
which is obtained via the user interface,
such that the recording trajectory is determined — 120

Corresponding positions on the recording
trajectory or, generally, the recording trajectory
calculated are/is then output via the control unit,
either a simple interface for outputting the
corresponding recording trajectory data,
or a control interface — 130

Fig. 1b

APPARATUS AND METHOD FOR CALCULATING A RECORDING TRAJECTORY

CROSS-REFERENCE TO RELATED APPLICATIONS

This application is a continuation of copending International Application No. PCT/EP2017/068098, filed Jul. 18, 2017, which is incorporated herein by reference in its entirety, and additionally claims priority from German Application No. 10 2016 213 403.5, filed Jul. 21, 2016, which is also incorporated herein by reference in its entirety.

BACKGROUND OF THE INVENTION

Embodiments of the present invention relate to an apparatus and to a corresponding method for calculating a recording trajectory of a CT system. Another embodiment relates to a corresponding computer program.

X-ray computer tomography (CT) uses an advantageously full data set of radiographic or transmission images. Advantageously full for such a data set means that the image data processing following after recording separate x-ray transmission images, like reconstruction, can solve a question from a test task in a sufficiently precise manner. A specific succession of source, object and detector positions and orientations is referred to as trajectory.

Classical CT systems address such an object by manipulating object or source and detector, with the aim of generating a trajectory which scans advantageously large parts of a circle in an advantageously accurate manner.

Unusually large and/or complex objects on the one hand and demand for particularly fast measurements on the other hand result in the requirement of obtaining the information used for the test task from considerably fewer transmission images, maybe under restricted accessibility of the test object. Applying modern large-area x-ray systems comprising a high number of degrees of freedom and a large working space offers a way for using unconventional and novel trajectories which consider, and use most efficiently, the material characteristics and accessibility of the test object. However, the problem resulting is that a specific optimum trajectory has to be found. The quantity of possible trajectories is very large, in particular when considering that other CT parameters, like voltage, filtering, current and exposure time, are also components of the trajectory. In addition, the position or relative position and orientation of the object relative to the CT system may be a component of the trajectory. This is why there is need for an improved concept.

The object underlying the present invention is providing a concept optimizing the recording trajectory of a CT system such that the number of recordings is reduced and, nevertheless, the data set established by means of the recordings is sufficient for performing the test task.

SUMMARY

According to an embodiment, a calculating unit for calculating a recording trajectory of a CT system may have: a receive interface for receiving measurement and/or simulation data relative to the object to be recorded; an optimizer configured to determine the recording trajectory based on known degrees of freedom of the CT system, based on the measurement and/or simulation data and based on a test task from a group having a plurality of test tasks; and a control unit configured to output data in correspondence with the calculated recording trajectory for controlling a manipulation unit of the CT system.

According to another embodiment, a calculating unit for calculating a recording trajectory of a CT system may have: a receive interface for receiving measurement and/or simulation data relative to the object to be recorded; an optimizer configured to determine the recording trajectory based on known degrees of freedom of the CT system, based on the measurement and/or simulation data and based on a test task from a group having a plurality of test tasks; and a control unit configured to output data in correspondence with the calculated recording trajectory for controlling a manipulation unit of the CT system; wherein the group having a plurality of test tasks has the test task of establishing a geometrical structure and/or geometrical surface structure; wherein the group of test tasks has detecting characteristics of the materials using the volume of the object to be recorded; wherein the group of test tasks has establishing deviations in the volume of the object to be recorded; wherein the optimizer is configured to predetermine the recording parameters per position on the recording trajectory, and wherein the recording parameters vary between two positions on the recording trajectory; and wherein the recording parameters have exposure time, x-ray voltage, x-ray current and/or filtering.

According to another embodiment, a method for calculating a recording trajectory of a computer tomography system may have the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system.

According to still another embodiment, a calculating unit for calculating a recording trajectory of a CT system may have: a receive interface for receiving measurement and/or simulation data relative to the object to be recorded; an optimizer configured to determine the recording trajectory based on known degrees of freedom of the CT system, based on the measurement and/or simulation data and based on a test task from a group having a plurality of test tasks; and a control unit configured to output data in correspondence with the calculated recording trajectory for controlling a manipulation unit of the CT system and thereby control the CT system in correspondence with the calculated recording trajectory; wherein the optimizer is configured to generate different trajectories for different test tasks.

According to another embodiment, a calculating unit for calculating a recording trajectory of a CT system may have: a receive interface for receiving measurement data relative to the object to be recorded; an optimizer configured to determine the recording trajectory based on known degrees of freedom of the CT system, based on the measurement data and based on a test task from a group having a plurality of test tasks of determining the recording trajectory; and a control unit configured to output data in correspondence with the calculated recording trajectory for controlling a manipulation unit of the CT system and thereby control the CT system in correspondence with the calculated recording trajectory, wherein each further position on the recording trajectory is selected such that a successive improvement of the image to be recorded is obtained.

According to another embodiment, a calculating unit for calculating a recording trajectory of a CT system based on two robots, wherein an X-ray radiation source is arranged on a first robot, whereas the radiation detector is arranged on a second robot, may have: a receive interface for receiving measurement and/or simulation data relative to the object to be recorded; an optimizer configured to determine the recording trajectory based on known degrees of freedom of the CT system with its robots, based on the measurement and/or simulation data and based on a test task from a group having a plurality of test tasks of determining the recording trajectory; and a control unit configured to output data in correspondence with the calculated recording trajectory for controlling a manipulation unit of the CT system and thereby control the CT system in correspondence with the calculated recording trajectory; wherein the positions of the recording trajectory are selected such that a collision between the recording means and the surroundings of the object to be recorded is prevented.

Another embodiment may have a computer tomography system having an inventive calculating unit as mentioned above.

According to another embodiment, a method for calculating a recording trajectory of a computer tomography system may have the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system in order to control the CT system in correspondence with the calculated recording trajectory; wherein different trajectories are generated for different test tasks.

According to another embodiment, a method for calculating a recording trajectory of a computer tomography system may have the steps of: receiving measurement data relative to the object to be recorded; determining the recording trajectory based on known degrees of freedom of the CT system, based on the measurement data and based on a test task from a group having a plurality of test tasks, and outputting data in correspondence with the calculated recording trajectory for controlling a manipulation unit of the computer tomography system in order to control the CT system in correspondence with the calculated recording trajectory; wherein each further position on the recording trajectory is selected such that a successive improvement of the image to be recorded is obtained.

According to another embodiment, a method for calculating a recording trajectory of a computer tomography system based on two robots, wherein an X-ray radiation source is arranged on a first robot, whereas the radiation detector is arranged on a second robot, may have the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system in order to control the CT system in correspondence with the calculated recording trajectory; wherein the positions of the recording trajectory are selected such that a collision between the recording means and the surroundings of the object to be recorded is prevented.

Another embodiment may have a non-transitory digital storage medium having stored thereon a computer program for performing a method for calculating a recording trajectory of a computer tomography system, having the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system, when said computer program is run by a computer.

Another embodiment may have a non-transitory digital storage medium having stored thereon a computer program for performing a method for calculating a recording trajectory of a computer tomography system, having the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system in order to control the CT system in correspondence with the calculated recording trajectory; wherein different trajectories are generated for different test tasks, when said computer program is run by a computer.

Another embodiment may have a non-transitory digital storage medium having stored thereon a computer program for performing a method for calculating a recording trajectory of a computer tomography system, having the steps of: receiving measurement data relative to the object to be recorded; determining the recording trajectory based on known degrees of freedom of the CT system, based on the measurement data and based on a test task from a group having a plurality of test tasks, and outputting data in correspondence with the calculated recording trajectory for controlling a manipulation unit of the computer tomography system in order to control the CT system in correspondence with the calculated recording trajectory; wherein each further position on the recording trajectory is selected such that a successive improvement of the image to be recorded is obtained, when said computer program is run by a computer.

Another embodiment may have a non-transitory digital storage medium having stored thereon a computer program for performing a method for calculating a recording trajectory of a computer tomography system based on two robots, wherein an X-ray radiation source is arranged on a first robot, whereas the radiation detector is arranged on a second robot, having the steps of: receiving measurement and/or simulation data relative to the object to be recorded; determining the recording trajectory based on known degrees of freedom of the CT system, based on the measurement and/or simulation data and based on a test task from a group having a plurality of test tasks, and outputting data in correspondence with the calculated recording trajectory for controlling a manipulation unit of the computer tomography system in order to control the CT system in correspondence with the calculated recording trajectory; wherein the positions of the recording trajectory are selected such that a collision between the recording means and the surroundings of the object to be recorded is prevented, when said computer program is run by a computer.

Embodiments of the present invention provide a calculating unit for calculating a recording trajectory of a CT system. The calculating unit comprises a receive interface, an optimizer and a control unit. The receive interface serves for receiving measurement data, like intermediate images or object data calculated already, or simulation data relative to the object to be recorded, i.e., for example, from an x-ray simulation (which is based on CAD data of the object to be recorded, for example). The optimizer is configured to determine the recording trajectory to be tracked, based on the known degrees of freedom of the CT system (rotation CT system or helical CT system or also a CT system comprising a high number of degrees of freedom), based on the measurement and/or simulation data discussed above and based on a test task. The test task originates from a group comprising a plurality of test tasks, like establishing a volume model, establishing a surface model or detecting defects or voids. Based on the recording trajectory established, data corresponding thereto are output which serve for controlling a manipulation unit (like comprising one or several actuators/robots) of the computer tomography system. These may either be control data or, generally, data which describe the position and can then be moved to the controller.

This means that the invention is based on the finding that, in x-ray recording systems or CT systems which are able to detect 2D, 3D or 4D (3D+time) information on an object, the trajectory or, generally, the positions to be moved to can be optimized while knowing the specific test task and knowing the test object in that the number of separate recordings and, consequently, of positions to be moved to are reduced. The background of this is that, when compared to detecting a volume model, each task, like detecting the surface geometry, predetermines the boundary conditions for the trajectory but also for the recording parameters, like x-ray voltage or exposure time. The object itself is, or can be, of further influence. Usually, the simpler the object and the easier the test task (surface determination), the more the number of recording on the trajectory can be reduced. The angles moved to in space, however, are to be distributed sufficiently on the path of movement (trajectory). When the test task (like detecting cavities) and the geometry of the test object are very complex, usually the number of angles moved to in space is to be increased so as to achieve a sufficiently high resolution in the volume model.

This is where the improved concept becomes effective by analyzing, either before or while actually recording, the test object in its basic characteristics in order to detect its geometry, for example, and then determine the trajectory in dependence on the recording mode selected. As a result, the optimizer defines that trajectory (i.e. that succession of position and orientations of the manipulators) where—possibly using the least individual images possible—the result is an image of optimum and, for a task, sufficient quality. The advantage here is that an optimum image quality having a minimum level of x-ray projections and, thus, a very short measuring duration can be achieved. Thus, each measurement is accelerated sufficiently for the respective test task given.

In correspondence with embodiments, interim data, generated during the measurement, which are sufficiently good in order to identify the edge condition of the object, like undercuts or highly varying surface, like in a cooling body, or a geometry or volume model which is derived from the CAD data, for example, serve as measurement and/or simulation data. In one embodiment including the model established in real time, either the intermediate images or the interim data output by image processing (like voxel model which, for example, has not been reconstructed completely, or where there is no final database, or intermediate images, i.e. 2D data) but also a data set established partly (in correspondence with the task) can serve as an input quantity before calculating the trajectory.

In correspondence with embodiments, the calculating unit comprises a user interface using which the respective test task can be established. Three different basic test tasks are differentiated between, for example. A first test task refers to averaging a geometrical structure and/or a geometrical surface structure. With this test task, the recording trajectory, or the setting of the CT system, is selected such that high-frequency features of the object to be recorded can be scanned well and, in particular, large gradients, as originate from edges, for example, can be detected when recording the objected to be recorded. In correspondence with another embodiment, a second test task relates to detecting attenuation coefficients across the volume of the object to be recorded. In this case, requirements to recording and, thus, to the recording trajectory are increased. The attenuation coefficient can be considered to be a material characteristic which, in combination with additional knowledge (like material density), allows drawing conclusions as to the material. In this case, usually longer recording or exposure durations and a higher number of angles in space are used. In correspondence with an embodiment, a further test task refers to establishing deviations, like errors or cavities, in the volume of the object to be recorded. It is not only needed here for the density in the volume to be well-detectable, but, above all, for the density and the changes in density to be resolved very well. Here, the recording trajectory can be selected such that individual regions which hint at a local variation in density are zoomed to. In correspondence with embodiments, it would also be feasible for a successive improvement to be strived for with such regions. Tracking a Fibonacci grid on the surface of a sphere would also be conceivable here. Tracking a trajectory with variable magnification would also be possible.

In correspondence with further embodiments, the recording trajectory may also be selected such that collisions, like with the object or test surroundings, are avoided. This is possible since, when knowing the object, the free space is known sufficiently well, based on the measurement or simulation data established before.

In correspondence with further embodiments, the optimizer may also be configured to predetermine or, more precisely, to vary the recording parameters, depending on the position on the recording trajectory. When the object comprises a different, for example, thinner, length extension in one space direction, for example, than in the other space direction, a short exposure time can be selected once, or be sufficient, whereas, with the longer extension in length, the exposure time for this angle in space has to be increased correspondingly. Among the recording parameters, not only is the exposure time adjusted, but also the x-ray voltage, the x-ray current or x-ray filtering.

In correspondence with a further embodiment, the correction data per angle in space may vary and, thus, advantageously be stored, in addition to the respective positions on the recording trajectory. The correction data basically are the so-called bright (or light) images based on which calibration is to take place. If there is no such bright image for every position on the recording trajectory, it can be determined or simulated based on the neighboring positions.

A further embodiment relates to a CT system comprising an optimizer as is characterized above.

A further embodiment provides a corresponding method comprising the steps of receiving measurement and simulation data, determining the recording trajectory and outputting the data for controlling the manipulation unit.

In correspondence with a further embodiment, a computer program for performing the method may be used.

BRIEF DESCRIPTION OF THE DRAWINGS

Embodiments of the present invention will be discussed below referring to the appended drawings, in which:

FIG. 1b shows a schematic flowchart of the method when calculating a recording trajectory in accordance with the basic embodiment;

DETAILED DESCRIPTION OF THE INVENTION

Figure 1A:
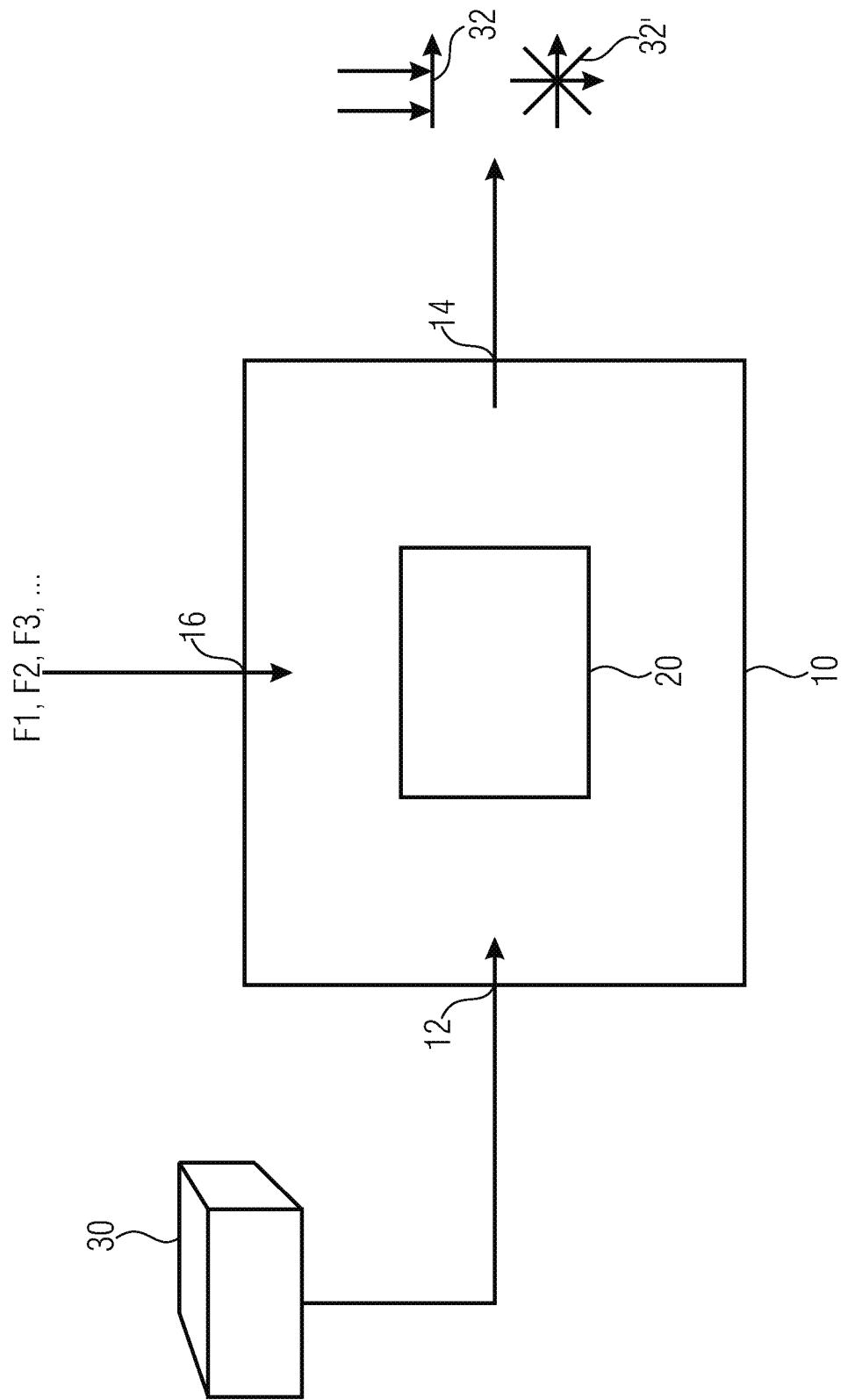
FIG. 1a shows a schematic block circuit diagram of a calculating unit comprising an optimizer in accordance with a basic embodiment.

Before discussing below embodiments of the present invention in greater detail referring to the appended drawings, it is to be pointed out that elements and structures of equal effect are provided with equal reference numerals so that the description thereof is mutually applicable and interchangeable.

FIG. 1 shows a calculating unit 10 for calculating a recording trajectory of a CT system. The calculating unit comprises the receive interface 12, the optimizer 20 and a control unit 14. Furthermore, in this embodiment, the calculating unit comprises an interface 16 for receiving a current recording situation (like position/orientation of the object).

Measurement and/or simulation data relative to the object to be recorded are obtained via the interface 12. In this case, these are simulation data from an x-ray simulation for the recording object 30, wherein the x-ray simulation may, for example, be based on CAD data for the recording object 30. As is illustrated in FIG. 1b, in the method 100 performed, this corresponds to receiving the measurement and/or simulation data in step 110. These data are then analyzed by the optimizer and processed, in combination with the respective case (cf. reference numerals F1 to F3) which is obtained via the user interface 16, such that the recording trajectory 32 is determined. In the method 100, this step corresponds to step 120.

Exemplarily, in the object 30 which in this case is illustrated as a cube and the exemplarily test task F1 of "establishing a surface structure", the number and positions on the recording trajectory 32 can be reduced such that only four or slightly more recordings have to be recorded along the lateral surfaces of the rectangular cube 30, for example, in order to determine by these good gradient images which indicate the edges.

These corresponding positions on the recording trajectory or, generally, the recording trajectory 32 calculated are/is then output via the control unit 14, either a simple interface for outputting the corresponding recording trajectory data, or a control interface. In the method 100, this corresponds to step 130.

In correspondence with the alternative or additional test task F3 of "detecting voids", the recording trajectory 32' may also be determined such that a plurality of positions along the recording trajectory 32' are recorded in order to be able to establish, in the case of the cuboid object 30, a sufficiently detailed voxel model where irregularities in the density distribution can be recognized.

The alternative or additional test task, determined in correspondence with a further embodiment, of "establishing a volume dataset" (with the goal of material recognition), based on the cuboid test body 30, would not require such a detailed database as is, for example, the case for test task F3, but nevertheless a higher degree of details than in test task F1.

It is to be pointed out here that the influence of the geometry or, generally, of the test body 30 will be discussed in greater detail referring to FIG. 2.

As a result, the apparatus 10 allows reducing or eliminating the deficiencies, present in known technology, relating to determining the recording trajectory, in order to achieve a good test result or an image quality needed. An image here is to be understood to be a quantity (or a part thereof) of location-resolved information on the test object (CT volume, error list, edge image, surface mesh, . . . ).

Figure 1C:
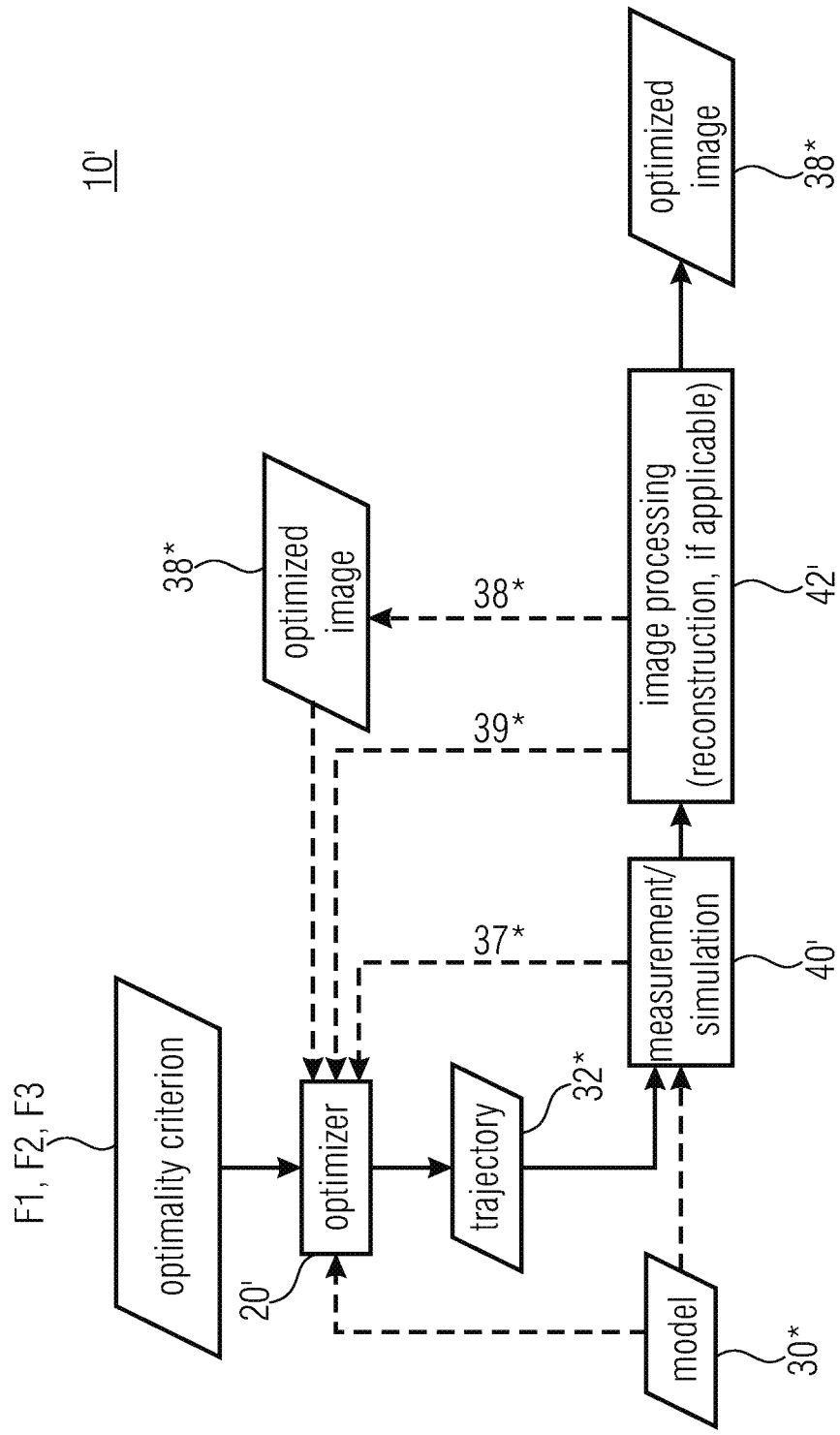
FIG. 1c shows a schematic block circuit diagram of an extended calculating unit.

A further embodiment of an apparatus 10' comprising an optimizer 20' will be discussed referring to FIG. 1c.

In the present embodiment, it is assumed that when, strictly speaking, not being part of the calculating device 10', a unit for measuring and simulation 40' and an image processing unit 42' are also provided which usually are part of the CT system. The unit for measuring and simulation 40' receives the recording trajectory 32* and controls the CT system based thereon. Block 42 downstream of the measurement and simulation receives from the measurement and simulation the corresponding intermediate images 37* for reconstruction. Either a raw dataset (voxel model, cf. reference numeral 37*) or an optimized image 38* can be output from this. It is to be pointed out again that an optimized image does not only mean the surface geometry, the volume model, but also a list of positions of voids or other information. It is to be pointed out here that the optimized image 38* is output in particular to the output interface of the CT system, but may also be output to the optimizer 20' which calculates its trajectory 32* based thereon.

In the following discussion, it is assumed that trajectory 32*1 belongs to test task F1, whereas trajectory 32*2 belongs to the test task F2, and trajectory 32*3 belongs to test task F3.

The optimizer 20' may relate to an, optimum or non-optimum, predetermined model or model generated during the measurement 30' (pre-knowledge, CAD, surface model) of the test object and/or the setup and the manipulators of the test system, in order to optimize the recording trajectory 32' relating to information, like object geometry, accessibility, material and structure.

The optimizer 20' can generate different trajectories 32*1, 32*2, 32*3 relating to different kinds of image quality to be achieved. These types of image quality may, for example, include:

Test task F1: An optimum image 38* relative to describing the structure and surfaces of the test object (high-frequency features, gradients in the image; applied in metrology, for example).

Test task F2: A physically correct representation of the object in the form of advantageously correctly determinable material characteristics (attenuation coefficients, material and density) over the entire measuring volume with a predetermined detail recognizability (resolution and contrast).

Test task F3: A sufficiently reliable representation of unknown deviations or deviations to be expected in the object from the optimum or non-optimum model. Depending on the task, the optimizer here may determine the optimum trajectory directly or vary the same successively during the measurement until optimality has been obtained.

Trajectories **32*1-32*3** here mean the succession of positions and orientations of one or several x-ray tubes, one or several x-ray detectors and one or several objects using one common or several independent position systems. The trajectory may contain the parameters of the x-ray source and the detector (voltage, filtering, current, exposure time).

The optimizer 20' optimizes and defines the trajectory **32'1-32*3 relative to the optimality criterion used 1), 2) or 3), if used, iteratively. Here, the optimizer uses one or several pieces of information, i.e. the optimum or non-optimum model 30', the result or intermediate result of the iterative optimization ("optimized image 38*"), the result or intermediate result of a single x-ray recording (cf. 37*) and the result or intermediate result of image processing (cf. 39***). Thus, the result or intermediate result of an x-ray recording may also have been formed by means of an x-ray simulation instead of by measurement. The context is illustrated in FIG. 1c.

Although, in the above embodiment, only test tasks F1 to F3 have been discussed, it is to be pointed out here that there may be further test tasks or variations of the test tasks F1 to F3.

Since, apart from test tasks F1 to F3, the object to be examined plays a role, reference will be made below to the table of FIG. 2, discussing the influence of the test object on the recording trajectory.

Figure 2:
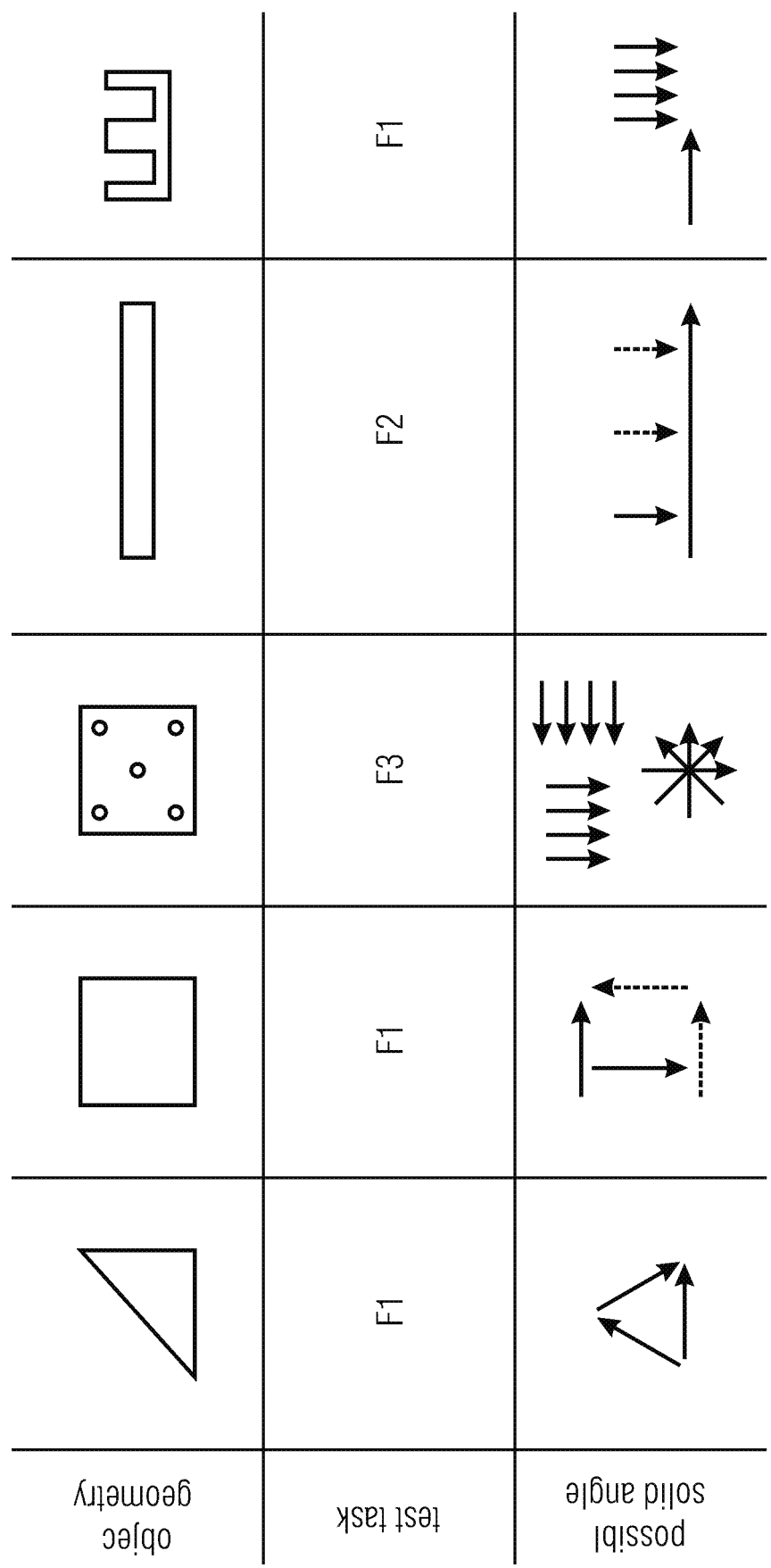
FIG. 2 shows some combinations of test task, test object and corresponding recording trajectory in accordance with an embodiment.

The table of FIG. 2 shows a total of four columns with four test objects and four respective test tasks. The first column shows a triangular test object, corresponding to the test task F1 of "recognizing the surface structure". In columns 2 and 3, a rectangular object is to be examined, once with the test task F1 of "recognizing surface structures" (column 2) and once with the test ask F3 of "recognizing voids" (column 3). In the fourth column, a flat element, like a disc, is to be examined with the test task F2 of "recognizing a volume model". In the fifth column, a body having undercuts, like a cooling body, the surface of which is to be scanned (F1) is assumed.

In the case of column 1, it becomes obvious that it is most advantageously for at least three angles in space to be examined, i.e. the angles in space in parallel to the legs of the triangular object. The corresponding x-ray parameters (x-ray voltage, etc.) here are to be selected such that the edges or gradients forming at the edges can be detected well.

For the test task in the second column, it should basically be sufficient for the trajectory to be selected such that angles offset to one another by roughly 90° or by 92° in space (generally angles in the region between 85° and 100°, advantageously larger than 90°) on the trajectory are moved to in order to allow surface detection. For good measure, the two further angles in space illustrated in broken lines can also be moved to in order to allow verification.

Based on the embodiment where the intermediate images are considered when determining the trajectories, a case is conceivable where an oblique transmission (cf. dotted lines) takes place in the first radiography so that variations (based on this first transmission angle by 90° each, for example) would result in an erroneous measurement. However, in oblique transmission, there is no sharp gradient to be recognized so that, for the second angle in space, a corresponding angle in space which offers a sufficiently high gradient is searched so as to obtain the two or four optimum angles in space.

The embodiment in the third column deals with the same object as does the second column, but using a different test task. Here it makes sense to set the transmission parameters such that a good spatial resolution can be achieved in the attenuation images which allow drawing conclusions as to the material density. Here, either a plurality of parallel recordings or a further plurality of parallel recordings offset by 90%, for example, are performed or the cube is transmitted in a high number of different angles in space around the 360° axis.

The embodiment of column 4 again deals with an area where the density over the entire object volume is to be determined. The transmission path in parallel to the area illustrates that a very large volume is to be transmitted here which uses considerable exposure times in order to achieve sufficient precision. Reversely, in the case of transverse transmission (through the thin plane), it is not necessary to operate at such long exposure times so that the exposure time here can be reduced correspondingly. Otherwise, it may be needed here for some parallel recordings to be taken, since the optical path between the radiation source and the x-ray detector may not allow transmitting the entire area. This is characterized by the additional dotted arrow in the row "possible solid angle" (or angle in space). When establishing the angles to be moved to in space, the orientation of the object in space also plays a decisive role since the cooling body, for example, can be scanned well from the side (i.e. in the transverse direction relative to the cooling fins), but only poorly from above or below.

In the case of column 1, basically the same angles in space are moved to as are in column 2, wherein, however, due to the undercuts or recesses, additionally further parallel (offset) measurements of the surface are performed. With "true" undercuts which are impossible to "illuminate" from any side, the degree of scanning is to be increased such that these undercuts can be recognized in a volume model (cf. example from column 3).

Subsequently, further possible variations of trajectories or influential parameters for the trajectory will be discussed.

In correspondence with an embodiment, unusual trajectories may also be addressed, for example when zooming-in in the example of column 3. The classes of x-ray recording trajectories claimed exemplarily comprise successively improving recording trajectories (like Fibonacci grids on the surface of the sphere), scanning of constant magnification with trajectories on surfaces of a sphere, trajectories where x-ray source, detector and object are not located on a straight, or the x-ray source is not located on the normal of the x-ray detector in the image center thereof and, in particular, trajectories for scanning the object with varying magnification, i.e. with variable distances between x-ray source and detector to the object. The variable distance serves for obtaining a variable magnification M of a section of the reproduction object while using the following law:

$$M=QDD/QOD,$$

wherein M is the geometrical magnification, QDD the source-to-detector distance and QOD the source-to-object distance.

In correspondence with another embodiment, the trajectories may be optimized relative to different boundary conditions of the real implemented recording or manipulation system. This may, for example, comprise: avoiding collisions with the object, with the manipulation system itself, with space or with persons in the working space, considering achievable, non-achievable or limitedly achievable positions in the working space of the manipulation system, differing precision achievable by the manipulation system at different locations in the working space, with different moving speeds, different directions of movement or different changes in the direction of movement or speed. This particularly means that such trajectories minimizing the overall time used for a measurement are formed.

In accordance with another embodiment, the parameter exposure time, current, voltage and filtering as a component of trajectory optimization may be optimized in parallel to the trajectories. This means that the tuple of these parameters is determined optimally for the entire measurement or for every x-ray recording separately.

In correspondence with another embodiment, it would also be conceivable to determine the bright images to form an optimized trajectory, without measuring the bright images in a void or empty movement of the trajectory.

Bright images are the detector images used for correcting inhomogeneous detector characteristics and illuminations, with no object in the optical path. If the relative position and orientation of x-ray source and detector, or x-ray parameters, like exposure time, current, voltage, filtering, are not constant over a measurement, the correction images will not be constant either and are correspondingly complicated to determine by means of measurements. The variable part of these bright images is either calculated from the radiation field of the x-ray tube recorded before or is estimated by means of x-ray simulation of the recording geometry and parameters.

Figure 3:
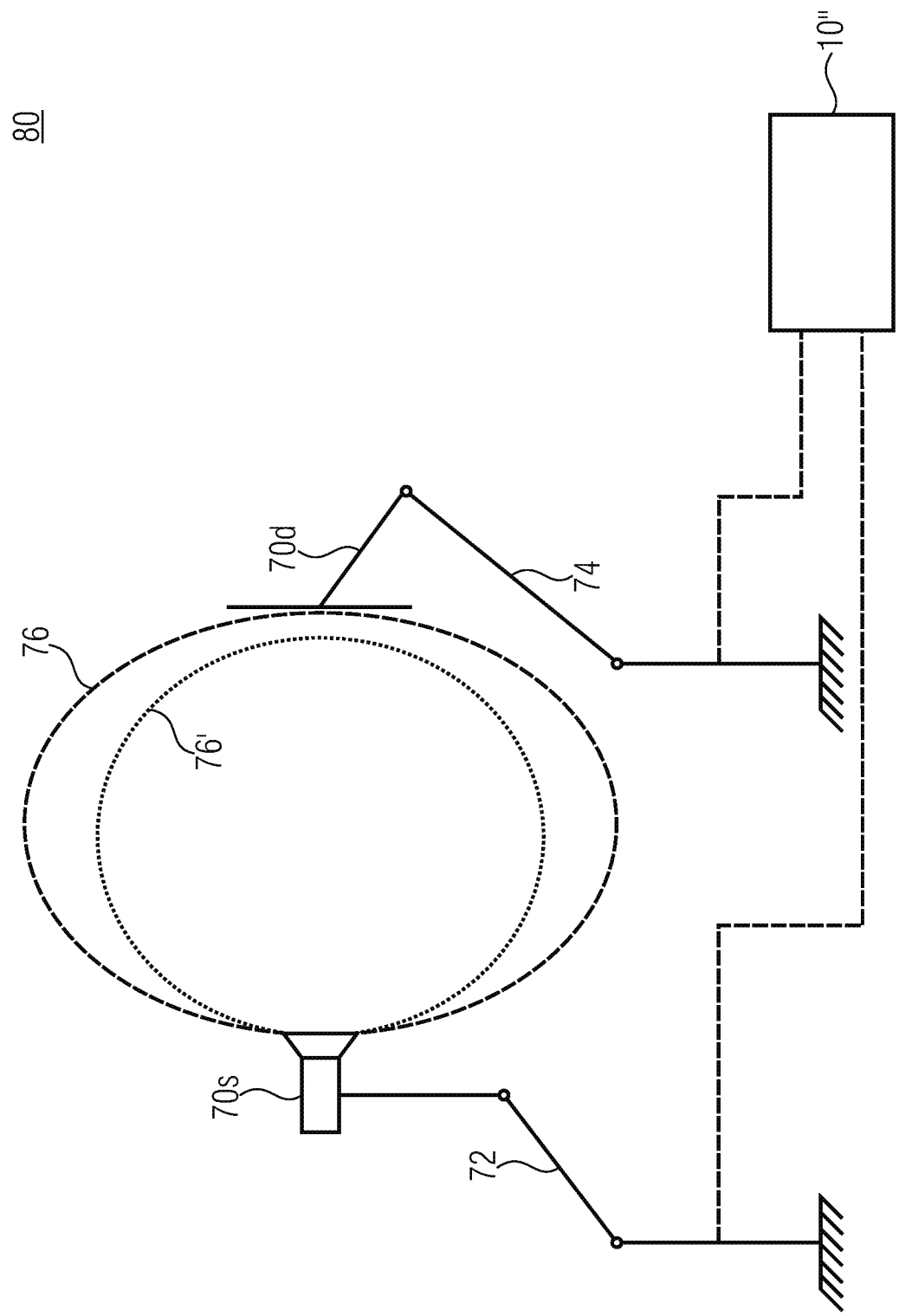
FIG. 3 shows a CT system in accordance with another embodiment.

A computer tomography system 80 which is based on robots 72 and 74 will be discussed below referring to FIG. 3.

FIG. 3a shows a possible computer tomography system 80 where the x-ray radiation source 70s is arranged on a first robot 72, whereas the radiation detector 70d is provided on a second robot 74. X-ray radiation source 70s and radiation detector 70d may be varied in space as desired by these two robots 72 and 74. Exemplarily, the two elements 70s and 70d may be moved on the trajectory 76, in this case a circular path, so that the corresponding angles in space can be moved to along this circular path. The radius of the circular path can, as is illustrated here using the broken line 76', be decreased in order to obtain a higher spatial resolution, for example. It is to be mentioned here that the different positions need not be located on one and the same circular path, i.e. in a common plane, but may be distributed in space around the object as desired (which is made possible advantageously by the CT system 80 with its two robots 72 and 74). Expressed differently, this means that the trajectories are defined by any positions addressable by the robot 72 and 74.

In correspondence with another embodiment, the computer tomography system 80 comprising the calculating unit 10", the robots 72 and 74 and the modules of the x-ray units 70s and 70d is provided.

In correspondence with another embodiment, the object to be examined can be held by another robot the freedom of movement of which may be used for realizing a trajectory. This means that it is also conceivable for the CT system to comprise more than two robots.

Embodiments mentioned above allow superior image quality compared to conventional computer tomography by means of unconventional optimized trajectories, at maybe varied recording parameters.

Further embodiments allow automated path planning for complex recording systems, so that, apart from the optimum image quality, limitations due to the recording system, like accessibility, precision or speed, can be considered.

The method in accordance with the above embodiments is particularly relevant for computer tomography of large and/or complex-shape elements, like in the field of automobile manufacturing, aerospace manufacturing having new recording systems with a high number of degrees of freedom in a large working space, like robot-based computer tomography, for example.

The method can contribute to accelerating fast production-integrated inline computer tomography and thus increasing the clock and efficiency of testing.

Additionally, in computer tomography, the method may generally contribute to increasing the image quality and, thus, result in a more reliable representation of smaller structures.

Transferring the method to medical applications is possible in order to contribute to increased image quality and reduced doses for patients in this field.

Although some aspects have been described in the context of an apparatus, it is clear that these aspects also represent a description of the corresponding method, such that a block or element of an apparatus also corresponds to a respective method step or a feature of a method step. Analogously, aspects described in the context with or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods may be performed by any hardware apparatus. This can be universally applicable hardware, such as a computer processor (CPU), or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A calculating unit for calculating a recording trajectory of a CT system, comprising:
   a receive interface for receiving measurement and/or simulation data relative to an object to be recorded;
   an optimizer configured to determine the recording trajectory based on known degrees of freedom of the CT system, based on the measurement and/or simulation data and based on a test task from a group comprising a plurality of test tasks; and
   a control unit configured to output data in correspondence with the calculated recording trajectory for controlling a manipulation unit of the CT system.

2. The calculating unit in accordance with claim 1, wherein the measurement and/or simulation data comprise an optimum model generated during a measurement or a non-optimum model generated during a measurement, a geometry model and/or a volume model.

3. The calculating unit in accordance with claim 1, wherein the measurement and/or simulation data are taken when recording the object to be recorded using the CT system.

4. The calculating unit in accordance with claim 3, wherein the measurement and/or simulation data comprise intermediate images and/or interim data output by image processing.

5. The calculating unit in accordance with claim 3, wherein the measurement and/or simulation data comprise a data object calculated by the image processing in correspondence with the test task.

6. The calculating unit in accordance with claim 1, wherein the calculating unit comprises a user interface using which the test task is selected.

7. The calculating unit in accordance with claim 1, wherein the group comprising a plurality of test tasks comprises the test task of establishing a geometrical structure and/or geometrical surface structure.

8. The calculating unit in accordance with claim 7, wherein the positions on the recording trajectory are selected such that high-frequency features of the object to be recorded and/or gradients are detectable when recording the object to be recorded.

9. The calculating unit in accordance with claim 1, wherein the group of test tasks comprises detecting characteristics of materials using the volume of the object to be recorded.

10. The calculating unit in accordance with claim 9, wherein the positions of the recording trajectories are selected such that attenuation coefficients and/or the density of the materials in the volume of the object to be recorded are detectable in the recordings.

11. The calculating unit in accordance with claim 1, wherein the group of test tasks comprises establishing deviations in the volume of the object to be recorded.

12. The calculating unit in accordance with claim 11, wherein the positions on the recording trajectory are selected such that local variations in attenuation coefficients are detectable in the recordings.

13. The calculating unit in accordance with claim 1, wherein every further position on the recording trajectory is selected such that a successive improvement of an image to be recorded is achieved; and/or
   wherein the positions on the recording trajectory are selected with a variable magnification and/or decreasing distance between the object to be recorded and the image detector.

14. The calculating unit in accordance with claim 1, wherein the optimizer is configured to select the positions on the recording trajectory such that a collision between the recording unit and the object to be recorded is prevented.

15. The calculating unit in accordance with claim 1, wherein the positions of the recording trajectory are selected such that a collision between the recording unit and surroundings of the object to be recorded is prevented.

16. The calculating unit in accordance with claim 1, wherein the optimizer is configured to predetermine the recording parameters per position on the recording trajectory, and wherein the recoding parameters vary between two positions on the recording trajectory; and/or
   wherein the recording parameters comprise exposure time, x-ray voltage, x-ray current and/or filtering.

17. The calculating unit in accordance with claim 1, wherein the optimizer establishes correction data from a set of stored correction data for each position on the recording trajectory or calculates corrected correction data based on the stored correction data for neighboring positions; and/or
wherein the optimizer establishes correction data from a memory for the recording parameters selected or calculates corrected correction data based on the correction data stored for similar parameters.

18. A computer tomography system comprising a calculating unit in accordance with claim 1.

19. A calculating unit for calculating a recording trajectory of a CT system, comprising:
a receive interface for receiving measurement and/or simulation data relative to an object to be recorded;
an optimizer configured to determine the recording trajectory based on known degrees of freedom of the CT system, based on the measurement and/or simulation data and based on a test task from a group comprising a plurality of test tasks; and
a control unit configured to output data in correspondence with the calculated recording trajectory for controlling a manipulation unit of the CT system;
wherein the group comprising a plurality of test tasks comprises the test task of establishing a geometrical structure and/or geometrical surface structure;
wherein the group of test tasks comprises detecting characteristics of materials using the volume of the object to be recorded;
wherein the group of test tasks comprises establishing deviations in the volume of the object to be recorded;
wherein the optimizer is configured to predetermine the recording parameters per position on the recording trajectory, and wherein the recording parameters vary between two positions on the recording trajectory; and
wherein the recording parameters comprise exposure time, x-ray voltage, x-ray current and/or filtering.

20. A computer tomography system comprising a calculating unit in accordance with claim 19.

21. A method for calculating a recording trajectory of a computer tomography system, comprising:
receiving measurement and/or simulation data relative to an object to be recorded;
determining the recording trajectory based on known degrees of freedom of the CT system, based on the measurement and/or simulation data and based on a test task from a group comprising a plurality of test tasks, and
outputting data in correspondence with the calculated recording trajectory for controlling a manipulation unit of the computer tomography system.

22. A calculating unit for calculating a recording trajectory of a CT system, comprising:
a receive interface for receiving measurement and/or simulation data relative to an object to be recorded;
an optimizer configured to determine the recording trajectory based on known degrees of freedom of the CT system, based on the measurement and/or simulation data and based on a test task from a group comprising a plurality of test tasks; and
a control unit configured to output data in correspondence with the calculated recording trajectory for controlling a manipulation unit of the CT system and thereby control the CT system in correspondence with the calculated recording trajectory;
wherein the optimizer is configured to generate different trajectories for different test tasks.

23. A computer tomography system comprising a calculating unit in accordance with claim 22.

24. A calculating unit for calculating a recording trajectory of a CT system, comprising:
a receive interface for receiving measurement data relative to an object to be recorded;
an optimizer configured to determine the recording trajectory based on known degrees of freedom of the CT system, based on the measurement data and based on a test task from a group comprising a plurality of test tasks of determining the recording trajectory; and
a control unit configured to output data in correspondence with the calculated recording trajectory for controlling a manipulation unit of the CT system and thereby control the CT system in correspondence with the calculated recording trajectory,
wherein each further position on the recording trajectory is selected such that a successive improvement of an image to be recorded is achieved.

25. A computer tomography system comprising a calculating unit in accordance with claim 24.

26. A calculating unit for calculating a recording trajectory of a CT system based on two robots, wherein an X-ray radiation source is arranged on a first robot, whereas the radiation detector is arranged on a second robot, comprising:
a receive interface for receiving measurement and/or simulation data relative to an object to be recorded;
an optimizer configured to determine the recording trajectory based on known degrees of freedom of the CT system with its robots, based on the measurement and/or simulation data and based on a test task from a group comprising a plurality of test tasks of determining the recording trajectory; and
a control unit configured to output data in correspondence with the calculated recording trajectory for controlling a manipulation unit of the CT system and thereby control the CT system in correspondence with the calculated recording trajectory;
wherein the positions of the recording trajectory are selected such that a collision between the recording unit and the surroundings of the object to be recorded is prevented.

27. A computer tomography system comprising a calculating unit in accordance with claim 26.

28. A method for calculating a recording trajectory of a computer tomography system, comprising:
receiving measurement and/or simulation data relative to an object to be recorded;
determining the recording trajectory based on known degrees of freedom of the CT system, based on the measurement and/or simulation data and based on a test task from a group comprising a plurality of test tasks, and
outputting data in correspondence with the calculated recording trajectory for controlling a manipulation unit of the computer tomography system in order to control the CT system in correspondence with the calculated recording trajectory;
wherein different trajectories are generated for different test tasks.

29. A method for calculating a recording trajectory of a computer tomography system, comprising:
receiving measurement data relative to an object to be recorded;
determining the recording trajectory based on known degrees of freedom of the CT system, based on the measurement data and based on a test task from a group comprising a plurality of test tasks, and outputting data in correspondence with the calculated recording trajectory for controlling a manipulation unit of the computer tomography system in order to control the CT system in correspondence with the calculated recording trajectory;

wherein each further position on the recording trajectory is selected such that a successive improvement of an image to be recorded is achieved.

30. A method for calculating a recording trajectory of a computer tomography system based on two robots, wherein an X-ray radiation source is arranged on a first robot, whereas the radiation detector is arranged on a second robot, comprising:

receiving measurement and/or simulation data relative to an object to be recorded;

determining the recording trajectory based on known degrees of freedom of the CT system, based on the measurement and/or simulation data and based on a test task from a group comprising a plurality of test tasks, and outputting data in correspondence with the calculated recording trajectory for controlling a manipulation unit of the computer tomography system in order to control the CT system in correspondence with the calculated recording trajectory;

wherein the positions of the recording trajectory are selected such that a collision between the recording unit and surroundings of the object to be recorded is prevented.

31. A non-transitory digital storage medium having stored thereon a computer program for performing a method for calculating a recording trajectory of a computer tomography system, comprising:

receiving measurement and/or simulation data relative to an object to be recorded;

determining the recording trajectory based on known degrees of freedom of the CT system, based on the measurement and/or simulation data and based on a test task from a group comprising a plurality of test tasks, and outputting data in correspondence with the calculated recording trajectory for controlling a manipulation unit of the computer tomography system, when said computer program is run by a computer.

32. A non-transitory digital storage medium having stored thereon a computer program for performing a method for calculating a recording trajectory of a computer tomography system, comprising:

receiving measurement and/or simulation data relative to an object to be recorded;

determining the recording trajectory based on known degrees of freedom of the CT system, based on the measurement and/or simulation data and based on a test task from a group comprising a plurality of test tasks, and outputting data in correspondence with the calculated recording trajectory for controlling a manipulation unit of the computer tomography system in order to control the CT system in correspondence with the calculated recording trajectory;

wherein different trajectories are generated for different test tasks, when said computer program is run by a computer.

33. A non-transitory digital storage medium having stored thereon a computer program for performing a method for calculating a recording trajectory of a computer tomography system, comprising:

receiving measurement data relative to an object to be recorded;

determining the recording trajectory based on known degrees of freedom of the CT system, based on the measurement data and based on a test task from a group comprising a plurality of test tasks, and outputting data in correspondence with the calculated recording trajectory for controlling a manipulation unit of the computer tomography system in order to control the CT system in correspondence with the calculated recording trajectory;

wherein each further position on the recording trajectory is selected such that a successive improvement of an image to be recorded is achieved, when said computer program is run by a computer.

34. A non-transitory digital storage medium having stored thereon a computer program for performing a method for calculating a recording trajectory of a computer tomography system based on two robots, wherein an X-ray radiation source is arranged on a first robot, whereas the radiation detector is arranged on a second robot, comprising:

receiving measurement and/or simulation data relative to an object to be recorded;

determining the recording trajectory based on known degrees of freedom of the CT system, based on the measurement and/or simulation data and based on a test task from a group comprising a plurality of test tasks, and outputting data in correspondence with the calculated recording trajectory for controlling a manipulation unit of the computer tomography system in order to control the CT system in correspondence with the calculated recording trajectory;

wherein the positions of the recording trajectory are selected such that a collision between the recording unit and surroundings of the object to be recorded is prevented, when said computer program is run by a computer.

* * * * *